No. 897,453. PATENTED SEPT. 1, 1908.
C. R. BYAM.
COMBINED SALT AND PEPPER SHAKER.
APPLICATION FILED JULY 8, 1907.

Witnesses

Inventor
C. R. Byam.
By
Attorneys

UNITED STATES PATENT OFFICE.

CHARLES R. BYAM, OF CHICAGO, ILLINOIS.

COMBINED SALT AND PEPPER SHAKER.

No. 897,453.

Specification of Letters Patent.

Patented Sept. 1, 1908.

Application filed July 8, 1907. Serial No. 382,767.

*To all whom it may concern:*

Be it known that I, CHARLES R. BYAM, citizen of the United States, residing at Chicago, in the county of Cook and State of Illinois, have invented certain new and useful Improvements in a Combined Salt and Pepper Shaker, of which the following is a specification.

The present invention relates to improvements in condiment holders and more particularly to a combined salt and pepper shaker embodying novel means for controlling the discharge of the condiment.

The object of the invention is to design a simple and inexpensive shaker of this character in which the various parts can be readily removed either for cleaning or refilling purposes.

Figure 1:
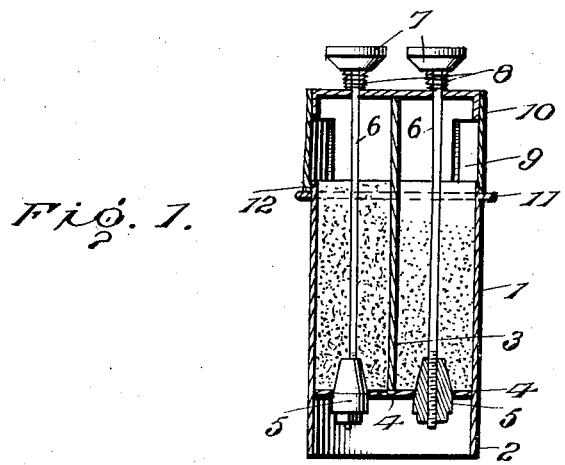
Figure 2:
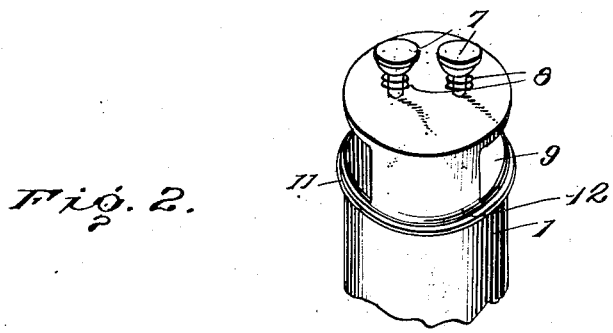

For a full description of the invention and the merits thereof and also to acquire a knowledge of the details of construction and the means for effecting the result, reference is to be had to the following description and accompanying drawings, in which:

Figure 1 is a longitudinal sectional view through a salt and pepper shaker embodying the invention. Fig. 2 is a detail view of the upper portion of the shaker.

Corresponding and like parts are referred to in the following description and indicated in all the views of the drawings by the same reference characters.

Specifically describing the invention the numeral 1 designates a casing which in the present instance is shown as cylindrical in shape, the sides of the casing being extended slightly below the bottom thereof to form the downwardly projecting flange 2. A transverse partition 3 divides the interior of the casing into a plurality of compartments designed to receive different condiments. The bottom of the casing 1 is formed with a plurality of discharge openings 4, one of the openings being provided for each of the compartments and the said openings being approximately circular in shape. Valve members 5 are utilized to control the discharge through the openings 4 and are mounted upon valve stems 6 extending through the respective compartments and projecting through the top of the casing and slightly beyond the same where they terminate in the heads or finger pieces 7. Interposed between each of the heads 7 and the top of the casing is a coil spring 8 which surrounds the valve stem and operates to draw the same upwardly and hold the valve 5 closely against its seat. In the specific construction of the valves 5 it will be observed that the same are gradually reduced toward their inner ends and have an approximately conical shape whereby they are adapted to automatically take up wear and an accurate seating is assured. Attention is also directed to the fact that these valves have a threaded connection with the stems 6 and that by turning the latter the distance between the heads 7 and the top of the casing can be adjusted. This permits the degree to which the valve opens when the finger-piece is pressed inwardly to be regulated according to the character of the condiment being handled.

Lateral openings 9 are formed in the sides of the casing 1, preferably toward the upper end thereof, one of the lateral openings being provided for each of the compartments and the said openings serving as a means for filling the compartments. A collar 10 fitting removably upon the exterior of the casing 1 is designed to close the lateral openings 9 when the condiment holder is in use and this collar normally abuts against an annular rib 11 projecting from the casing and serving to enable the fingers to obtain a secure grip upon the casing when pressing upon the finger-pieces 7. This collar 10 may either slip freely over the end of the casing and be held in position by friction or as in the present instance the collar may have the lower edge thereof in a threaded engagement with the casing as indicated at 12.

The finger-pieces or heads 7 can be suitably marked to designate the character of the condiment within the corresponding compartments and all of the condiments can be discharged simultaneously by pressing upon all of the finger-pieces or the said condiments can be discharged independently of each other. Attention may be directed to the fact that the valves 5 normally project slightly below the bottom of the casing and that the downwardly projecting flange 2 holds the bottom of the casing spaced from the table or other support upon which the devices may be placed and enables the device to maintain an upright position.

Having thus described the invention, what is claimed as new is:

A condiment holder comprising a casing subdivided into a plurality of compartments and having an annular rib projecting outwardly therefrom, the said casing being threaded adjacent the rib and being formed with lateral openings communicating with the several compartments, and a collar fitting removably upon the exterior of the casing and normally closing the lateral openings, the said collar abutting against the annular rib and having one edge thereof in engagement with the before mentioned threaded portion of the casing adjacent the rib.

In testimony whereof I affix my signature in presence of two witnesses.

CHARLES R. BYAM. [L. S.]

Witnesses:
CLARENCE COLEMAN,
GEORGE M. CREE.